(12) United States Patent
Noda et al.

(10) Patent No.: US 9,890,250 B2
(45) Date of Patent: Feb. 13, 2018

(54) METHOD FOR PRODUCING POLYBENZOXAZOLE RESIN

(71) Applicant: Tokyo Ohka Kogyo Co., Ltd., Kawasaki-shi (JP)

(72) Inventors: Kunihiro Noda, Kanagawa (JP); Hiroki Chisaka, Kanagawa (JP); Dai Shiota, Kanagawa (JP); Masaru Shida, Kanagawa (JP)

(73) Assignee: TOKYO OHKA KOGYO CO., LTD., Kawasaki-Shi (JP)

( * ) Notice: Subject to any disclaimer, the term of this patent is extended or adjusted under 35 U.S.C. 154(b) by 0 days.

(21) Appl. No.: 14/716,581

(22) Filed: May 19, 2015

(65) Prior Publication Data

US 2015/0337084 A1    Nov. 26, 2015

(30) Foreign Application Priority Data

May 21, 2014 (JP) ................................. 2014-105584

(51) Int. Cl.
*C08G 73/22* (2006.01)
*C08G 73/00* (2006.01)

(52) U.S. Cl.
CPC ................... *C08G 73/22* (2013.01)

(58) Field of Classification Search
CPC ..................................................... C08G 73/22
USPC ........................................ 528/266, 243, 336
See application file for complete search history.

(56) References Cited

U.S. PATENT DOCUMENTS

2010/0121017 A1* 5/2010 De Weijer et al. ........... 528/183
2013/0324662 A1   12/2013 Honda

FOREIGN PATENT DOCUMENTS

| EP | 2695906 A1 | 2/2014 |
| JP | 2000-284480 A | 10/2000 |
| WO | WO 2008/131907 A1 | 11/2008 |
| WO | WO2012/137840 | 10/2012 |
| WO | WO 2015/046332 A1 | 4/2015 |

OTHER PUBLICATIONS

Extended European search in European Patent Application No. 15168303.4, dated Jul. 21, 2015.

* cited by examiner

*Primary Examiner* — Duc Truong
(74) *Attorney, Agent, or Firm* — Knobbe Martens Olson & Bear LLP

(57) ABSTRACT

A method for producing a polybenzoxazole resin, in which even when a polybenzoxazole precursor is heat treated at a low temperature, a polybenzoxazole resin that is excellent in mechanical properties, such as tensile elongation, and in chemical resistance, is suppressed in terms of coloration, and is high in transparency can be produced. A polybenzoxazole resin is formed by heating a polybenzoxazole precursor which is obtained by allowing an aromatic diaminediol and a diformyl compound or a dicarboxylic acid dihalide, to react with each other in a solvent containing an amide compound or a urea compound each having a specified structure, at 120° C. to 350° C.

18 Claims, No Drawings

METHOD FOR PRODUCING POLYBENZOXAZOLE RESIN

CROSS-REFERENCE TO RELATED APPLICATIONS

Priority is claimed on Japanese Patent Application No. 2014-105584, filed May 21, 2014, the content of which is incorporated herein by reference.

BACKGROUND OF THE INVENTION

Field of the Invention

The present invention relates to a method for producing a polybenzoxazole resin.

Polybenzoxazole resins are excellent in heat resistance, mechanical strength, insulation properties, dimensional stability, and the like, and therefore, they are widely used as not only fibers and films but also insulating materials or protective materials in electric or electronic parts, such as various devices or electronic substrates, e.g., multilayer wiring boards.

Related Art

In general, polybenzoxazole resins are formed by heat treating a precursor polymer which is obtained by polymerizing an aromatic diaminediol having an amino group and a hydroxyl group on carbon atoms adjacent to each other in an aromatic ring with a dialdehyde compound or a dicarbonyl compound, such as a dicarboxylic acid dihalide, in an organic solvent, such as N-methyl-2-pyrrolidone (NMP), dimethylacetamide (DMAc), and dimethylformamide (DMF), at a high temperature of about 300° C.

As specific examples of polybenzoxazole resins produced by such a method, there are known polybenzoxazole resins formed by heat treating a solution of a precursor polymer which is obtained by allowing an aromatic diaminediol having an amino group and a hydroxyl group on carbon atoms adjacent to each other in an aromatic ring to react with a di(4-formylphenyl)alkane or a di(4-halocarbonylphenyl)alkane in dimethylformamide, while increasing the temperature from 200° C. and finally up to 300° C. (see Patent Document 1).

[Patent Document 1] WO 2012/137840

SUMMARY OF THE INVENTION

But, as described in Patent Document 1, in the case of heat treating the solution of the precursor polymer obtained using a solvent such as dimethylformamide, there are involved such problems that a polybenzoxazole resin which is excellent in mechanical properties, such as tensile elongation, or in chemical resistance is hardly obtained, and that transparency of the resulting polybenzoxazole resin is apt to be impaired due to coloration. In particular, in the method described in Patent Document 1, heating of the precursor polymer is required to be conducted at a high temperature, and in the case of heating the precursor polymer at a low temperature of lower than 200° C., lowerings in mechanical properties, chemical resistance, transparency, and the like of the polybenzoxazole resin are remarkable.

In view of the foregoing problems, the present invention has been made, and an object thereof is to provide a method for producing a polybenzoxazole resin, in which even in the case of heat treating a polybenzoxazole precursor at a low temperature, a polybenzoxazole resin that is excellent in mechanical properties, such as tensile elongation, and in chemical resistance, is suppressed in terms of coloration, and is high in transparency can be produced.

The present inventors have found that the foregoing problems can be solved by heating a polybenzoxazole precursor which is obtained by allowing an aromatic diaminediol and a diformyl compound or a dicarboxylic acid dihalide to react with each other in a solvent containing an amide compound or a urea compound each having a specified structure, at 120 to 350° C. to form a polybenzoxazole resin, leading to accomplishment of the present invention.

The present invention is concerned with a method for producing a polybenzoxazole resin, including heating a polybenzoxazole precursor which is obtained by allowing an aromatic diaminediol compound represented by the following formula (1) and a dicarbonyl compound represented by the following formula (2) to react with each other in a solvent containing at least a compound (A) represented by the following formula (5), at 120 to 350° C.

(1)

In the formula (1), $R^1$ is a tetravalent organic group containing at least one aromatic ring; and with respect to two pairs of combinations of an amino group and a hydroxyl group contained in the aromatic diaminediol represented by the formula (1), in each of the combinations, the amino group and the hydroxyl group are bonded to two carbon atoms adjacent to each other on the aromatic ring contained in $R^1$.

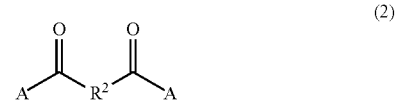

(2)

In the formula (2), $R^2$ represents a divalent organic group; and A represents a hydrogen atom or a halogen atom.

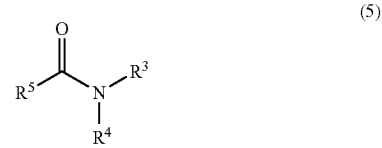

(5)

In the formula (5), each of $R^3$ and $R^4$ is independently an alkyl group having 1 to 3 carbon atoms; and $R^5$ is a group represented by the following formula (5-1) or (5-2):

(5-1)

(5-2)

in the formula (5-1), $R^6$ is a hydrogen atom or a hydroxyl group, and each of $R^7$ and $R^8$ is independently an alkyl group having 1 to 3 carbon atoms; and in the formula (5-2), each of $R^9$ and $R^{10}$ is independently a hydrogen atom or an alkyl group having 1 to 3 carbon atoms.

According to the present invention, it is possible to provide a method for producing a polybenzoxazole resin, in which even in the case of heat treating a polybenzoxazole precursor at a low temperature, a polybenzoxazole resin that is excellent in mechanical properties, such as tensile elongation, and in chemical resistance, is suppressed in terms of coloration, and is high in transparency can be produced.

DETAILED DESCRIPTION OF THE INVENTION

In the present invention, a polybenzoxazole precursor which is used for the production of a polybenzoxazole resin is prepared by allowing an aromatic diaminediol and a dicarbonyl compound that is a diformyl compound or a dicarboxylic acid dihalide each having a specified structure to react with each other in a solvent containing at least a compound (A) having a specified structure. The thus prepared polybenzoxazole precursor is heated at 120 to 350° C. to obtain a polybenzoxazole resin. The raw material compounds and the solvent used for the production of the polybenzoxazole resin, the production method of the polybenzoxazole precursor, and the production method of the polybenzoxazole resin are hereunder explained in order.

Raw Material Compounds

As the synthesis raw materials of the polybenzoxazole precursor, the aromatic diaminediol and the dicarbonyl compound having a specified structure are used. The aromatic diaminediol and the dicarbonyl compound are hereunder explained.

[Aromatic Diaminediol]

In the present invention, a compound represented by the following formula (1) is used as the aromatic diaminediol. The aromatic diaminediol may be used solely or in combination of two or more kinds thereof.

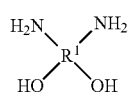

(1)

In the formula (1), $R^1$ is a tetravalent organic group containing at least one aromatic ring; and with respect to two pairs of combinations of an amino group and a hydroxyl group contained in the aromatic diaminediol represented by the formula (1), in each of the combinations, the amino group and the hydroxyl group are bonded to two carbon atoms adjacent to each other on the aromatic ring contained in $R^1$.

In the formula (1), $R^1$ is a tetravalent organic group containing at least one aromatic ring, and the number of carbon atoms thereof is preferably 6 to 50, and more preferably 6 to 30. $R^1$ may also be an aromatic group and may be a group in which two or more aromatic groups are bonded to each other via an aliphatic hydrocarbon group or a halogenated aliphatic hydrocarbon group, or a bond containing a hetero atom, such as an oxygen atom, a sulfur atom, and a nitrogen atom. Examples of the bond containing a hetero atom, such as an oxygen atom, a sulfur atom, and a nitrogen atom, which is contained in $R^1$, include —CONH—, —NH—, —N=N—, —CH=N—, —COO—, —O—, —CO—, —SO—, —SO$_2$—, —S—, and —S—S—, with —O—, —CO—, —SO—, —SO$_2$—, —S—, and —S—S— being preferred.

The aromatic ring contained in $R^1$ may be an aromatic heterocyclic ring. The aromatic ring bonded to the amino group and the hydroxyl group in $R^1$ is preferably a benzene ring. In the case where the ring bonded to the amino group and the hydroxyl group in $R^1$ is a condensed ring containing two or more rings, the ring bonded to the amino group and the hydroxyl group in the condensed ring is preferably a benzene ring.

Suitable examples of $R^1$ include groups represented by the following formulae (1-1) to (1-9).

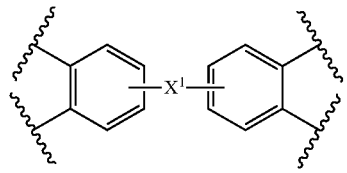

(1-1)

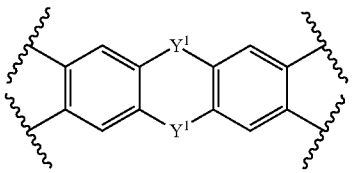

(1-2)

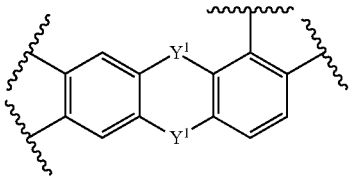

(1-3)

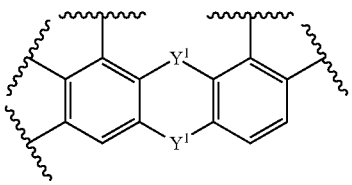

(1-4)

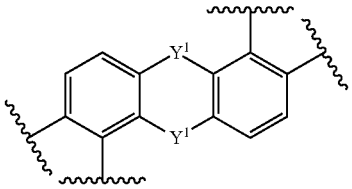

(1-5)

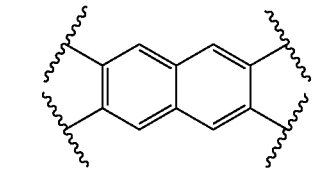

(1-6)

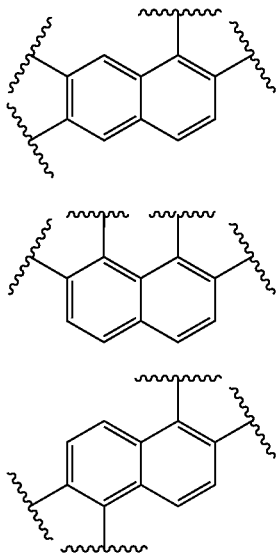

In the formula (1-1), $X^1$ is one member selected from the group consisting of an alkylene group having 1 to 10 carbon atoms, a fluorinated alkylene group having 1 to 10 carbon atoms, —O—, —S—, —SO—, —SO$_2$—, —CO—, —COO—, —CONH—, and a single bond. In the formulae (1-2) to (1-5), each $Y^1$ may be the same as or different from every other $Y^1$ and is one member selected from the group consisting of —CH$_2$—, —O—, —S—, —SO—, —SO$_2$—, —CO—, and a single bond.

Each of the groups of the foregoing formulae (1-1) to (1-9) may have one or plural substituents on the aromatic ring. As suitable examples of the substituent, a fluorine atom, an alkyl group having 1 to 6 carbon atoms, an alkoxy group having 1 to 6 carbon atoms, a fluorinated alkyl group having 1 to 6 carbon atoms, and a fluorinated alkoxy group having 1 to 6 carbon atoms are preferred. In the case where the substituent is a fluorinated alkyl group or a fluorinated alkoxy group, it is preferably a perfluoroalkyl group or a perfluoroalkoxy group.

Specific examples of the compound represented by the foregoing formula (1) include 2,4-diamino-1,5-benzenediol, 2,5-diamino-1,4-benzenediol, 2,5-diamino-3-fluoro-1,4-benzenediol, 2,5-diamino-3,6-difluoro-1,4-benzenediol, 2,6-diamino-1,5-dihydroxynaphthalene, 1,5-diamino-2,6-dihydroxynaphthalene, 2,6-diamino-3,7-dihydroxynaphthalene, 1,6-diamino-2,5-dihydroxynaphthalene, 4,4'-diamino-3,3'-dihydroxybiphenyl, 3,3'-diamino-4,4'-dihydroxybiphenyl, 2,3'-diamino-3,2'-dihydroxybiphenyl, 3,4'-diamino-4,3'-dihydroxybiphenyl, 4,4'-diamino-3,3'-dihydroxy-6,6'-ditrifluoromethylbiphenyl, 3,3'-diamino-4,4'-dihydroxy-6,6'-ditrifluoromethylbiphenyl, 2,3'-diamino-3,2'-dihydroxy-6,6'-ditrifluoromethylbiphenyl, 3,4'-diamino-4,3'-dihydroxy-6,6'-ditrifluoromethylbiphenyl, 4,4'-diamino-3,3'-dihydroxy-5,5'-ditrifluoromethylbiphenyl, 3,3'-diamino-4,4'-dihydroxy-5,5'-ditrifluoromethylbiphenyl, 2,3'-diamino-3,2'-dihydroxy-5,5'-ditrifluoromethylbiphenyl, 3,4'-diamino-4,3'-dihydroxy-5,5'-ditrifluoromethylbiphenyl, bis(4-amino-3-hydroxyphenyl)methane, bis(3-amino-4-hydroxyphenyl)methane, 3,4'-diamino-4,3'-dihydroxydiphenylmethane, bis(4-amino-4-hydroxy-6-trifluoromethyl)methane, bis(3-amino-4-hydroxy-6-trifluoromethyl)methane, 3,4'-diamino-4,3'-dihydroxy-6,6'-ditrifluoromethyldiphenylmethane, bis(4-amino-3-hydroxyphenyl)difluoromethane, bis(3-amino-4-hydroxyphenyl)difluoromethane, 3,4'-diamino-4,3'-dihydroxydiphenyldifluoromethane, bis(4-amino-3-hydroxy-6-trifluoromethylphenyl)difluoromethane, bis(3-amino-4-hydroxy-6-trifluoromethylphenyl)difluoromethane, 3,4'-diamino-4,3'-dihydroxy-6,6'-ditrifluoromethyldiphenyldifluoromethane, bis(4-amino-3-hydroxyphenyl)ether, bis(3-amino-4-hydroxyphenyl)ether, 3,4'-diamino-4,3'-dihydroxydiphenylether, bis(4-amino-3-hydroxy-6-trifluoromethylphenyl)ether, bis(3-amino-4-hydroxy-6-trifluoromethylphenyl)ether, 3,4'-diamino-4,3'-dihydroxy-6,6'-ditrifluoromethyldiphenylether, bis(4-amino-3-hydroxyphenyl)ketone, bis(3-amino-4-hydroxyphenyl)ketone, 3,4'-diamino-4,3'-dihydroxydiphenylketone, bis(4-amino-3-hydroxy-6-trifluoromethyl)ketone, bis(3-amino-4-hydroxy-6-trifluoromethyl)ketone, 3,4'-diamino-4,3'-dihydroxy-6,6'-ditrifluoromethyldiphenyketone, 2,2-bis(4-amino-3-hydroxyphenyl)propane, 2,2-bis(3-amino-4-hydroxyphenyl)propane, 2-(3-amino-4-hydroxyphenyl)-2-(4'-amino-3'-hydroxyphenyl)propane, 2,2-bis(4-amino-3-hydroxy-6-trifluoromethylphenyl)propane, 2,2-bis(3-amino-4-hydroxy-6-trifluoromethylphenyl)propane, 2-(3-amino-4-hydroxy-6-trifluoromethylphenyl)-2-(4'-amino-3'-hydroxy-6'-trifluoromethylphenyl)propane, 2,2-bis(3-amino-4-hydroxy-5-trifluoromethylphenyl)propane, 2,2-bis(4-amino-3-hydroxyphenyl)hexafluoropropane, 2,2-bis(3-amino-4-hydroxyphenyl)hexafluoropropane, 2-(3-amino-4-hydroxyphenyl)-2-(4'-amino-3'-hydroxyphenyl)hexafluoropropane, 2,2-bis(4-amino-3-hydroxy-6-trifluoromethylphenyl)hexafluoropropane, 2,2-bis(3-amino-4-hydroxy-6-trifluoromethylphenyl)hexafluoropropane, 2-(3-amino-4-hydroxy-6-trifluoromethylphenyl)-2-(4'-amino-3'-hydroxy-6'-trifluoromethylphenyl)hexafluoropropane, 2,2-bis(3-amino-4-hydroxy-5-trifluoromethylphenyl)hexafluoropropane, bis(4-amino-3-hydroxyphenyl)sulfone, bis(3-amino-4-hydroxyphenyl)sulfone, 3,4'-diamino-4,3'-dihydroxydiphenylsulfone, bis(4-amino-3-hydroxy-6-trifluoromethyl)sulfone, bis(3-amino-4-hydroxy-6-trifluoromethyl)sulfone, 3,4'-diamino-4,3'-dihydroxy-6,6'-ditrifluoromethyldiphenylsulfone, bis(4-amino-3-hydroxyphenyl) sulfide, bis(3-amino-4-hydroxyphenyl) sulfide, 3,4'-diamino-4,3'-dihydroxydiphenylsulfide, bis(4-amino-3-hydroxy-6-trifluoromethyl)sulfide, bis(3-amino-4-hydroxy-6-trifluoromethyl)sulfide, 3,4'-diamino-4,3'-dihydroxy-6,6'-ditrifluoromethyldiphenylsulfide, (4-amino-3-hydroxyphenyl)-4-amino-3-hydroxyphenylbenzoate, (3-amino-4-hydroxyphenyl)-3-amino-4-hydroxyphenylbenzoate, (3-amino-4-hydroxyphenyl)-4-amino-3-hydroxyphenylbenzoate, (4-amino-3-hydroxyphenyl)-3-amino-4-hydroxyphenylbenzoate, N-(4-amino-3-hydroxyphenyl)-4-amino-3-hydroxyphenylbenzamide, N-(3-amino-4-hydroxyphenyl)-3-amino-4-hydroxyphenylbenzamide, N-(3-amino-4-hydroxyphenyl)-4-amino-3-hydroxyphenylbenzamide, N-(4-amino-3-hydroxyphenyl)-3-amino-4-hydroxyphenylbenzamide, 2,4'-bis(4-amino-3-hydroxyphenoxy)biphenyl, 2,4'-bis(3-amino-4-hydroxyphenoxy)biphenyl, 4,4'-bis(4-amino-3-hydroxyphenoxy)biphenyl, 4,4'-bis(3-amino-4-hydroxyphenoxy)biphenyl, di[4-(4-amino-3-hydroxyphenyl)phenyl]ether, di[4-(3-amino-4-hydroxyphenoxy)phenyl]ether, 2,4'-bis(4-amino-3-hydroxyphenoxy)benzophenone, 2,4'-bis(3-amino-4-hydroxyphenoxy)benzophenone, 4,4'-bis(4-amino-3-hydroxyphenoxy)benzophenone, 4,4'-bis(3-amino-4-hydroxyphenoxy)benzophenone, 2,4'-bis(4-amino-3-hydroxyphenoxy)octafluorobiphenyl, 2,4'-bis(3-amino-4-hydroxyphenoxy)octafluorobiphenyl, 4,4'-bis(4-amino-3-hydroxyphenoxy)octafluorobiphenyl, 4,4'-bis(3-amino-4- hydroxyphenoxy)octafluorobiphenyl, 2,4'-bis(4-amino-3-hydroxyphenoxy)octafluorobenzophenone, 2,4'-bis(3-amino-4-hydroxyphenoxy)octafluorobenzophenone, 4,4'-bis(4-amino-3-hydroxyphenoxy)octafluorobenzophenone, 4,4'-bis(3-amino-4-hydroxyphenoxy)octafluorobenzophenone, 2,2-bis[4-(4-amino-3-hydroxyphenoxy)phenyl]propane, 2,2-bis[4-(3-amino-4-hydroxyphenoxy)phenyl]propane, 2,2-bis[4-(4-amino-3-hydroxyphenoxy)phenyl]hexafluoropropane, 2,2-bis[4-(3-amino-4-hydroxyphenoxy)phenyl]hexafluoropropane, 2,8-diamino-3,7-dihydroxydibenzofuran, 2,8-diamino-3,7-dihydroxyfluorene, 2,6-diamino-3,7-dihydroxyxanthene, 9,9-bis(4-amino-3-hydroxyphenyl)fluorene, and 9,9-bis(3-amino-4-hydroxyphenyl)fluorene.

Among these compounds, 2,2-bis(3-amino-4-hydroxyphenyl)hexafluoropropane is preferred from the standpoint that a polybenzoxazole resin having excellent transparency can be formed.

[Dicarbonyl Compound]

As the synthesis raw materials of the polybenzoxazole precursor, a dicarbonyl compound represented by the following formula (2) is used together with the aromatic diaminediol as explained above. By condensing the above-described aromatic diaminediol and the dicarbonyl compound represented by the following formula (2), the polybenzoxazole precursor is obtained.

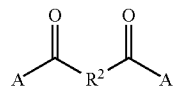
(2)

In the formula (2), $R^2$ represents a divalent organic group; and A represents a hydrogen atom or a halogen atom.

$R^2$ in the formula (2) may be an aromatic group, may be an aliphatic group, or may be a combined group of an aromatic group and an aliphatic group. $R^2$ is preferably a group containing an aromatic group and/or an alicyclic group from the standpoint that the resulting polybenzoxazole resin is favorable in heat resistance, mechanical properties, chemical resistance, and the like. The aromatic group contained in $R^2$ may be an aromatic hydrocarbon group, or may be an aromatic heterocyclic group.

$R^2$ may contain a halogen atom, an oxygen atom, a nitrogen atom, or a sulfur atom in addition to a carbon atom and a hydrogen atom. In the case where $R^2$ contains an oxygen atom, a nitrogen atom, or a sulfur atom, the oxygen atom, the nitrogen atom, or the sulfur atom may be contained in $R^2$ as a group selected from a nitrogen-containing heterocyclic group, —CONH—, —NH—, —N=N—, —CH=N—, —COO—, —O—, —CO—, —SO—, —SO$_2$—, —S—, and —S—S—. It is more preferred that the oxygen atom, the nitrogen atom, or the sulfur atom is contained in $R^2$ as a group selected from —O—, —CO—, —SO—, —SO$_2$—, —S—, and —S—S—.

In the formula (2), one of the two As may be a hydrogen atom, with the other being a halogen atom; however, it is preferred that both of the two As are a hydrogen atoms, or both of the two As are a halogen atom. In the case where A is a halogen atom, A is preferably chlorine, bromine, or iodine, and more preferably chlorine.

In the case of using, as the dicarbonyl compound represented by the formula (2), a dialdehyde compound in which both of the two As are a hydrogen atom, a polybenzoxazole intermediate represented by the following formula (3) is produced.

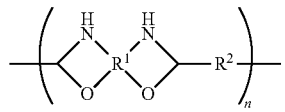
(3)

In the formula (3), $R^1$ and $R^2$ are the same as those in the formulae (1) and (2); and n is a repeating number of the unit represented by the formula (3).

In the case of using, as the dicarbonyl compound represented by the formula (2), a dicarboxylic acid dihalide in which both of the two As are a halogen atom, a polybenzoxazole intermediate represented by the following formula (4) is produced.

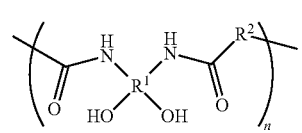
(4)

In the formula (4), $R^1$ and $R^2$ are the same as those in the formulae (1) and (2); and n is a repeating number of the unit represented by the formula (4).

The dialdehyde compound and the dicarboxylic acid dihalide, each of which is a suitable compound as the dicarbonyl compound, are hereunder explained.

(Dialdehyde Compound)

The dialdehyde compound which is used as the raw material of the polybenzoxazole precursor is a compound represented by the following formula (2-1). The dialdehyde compound may be used solely or in combination of two or more kinds thereof.

(2-1)

In the formula (2-1), $R^2$ is the same as that in the formula (2).

Suitable examples of the aromatic group or the aromatic ring-containing group as $R^2$ in the formula (2-1) include the following groups.

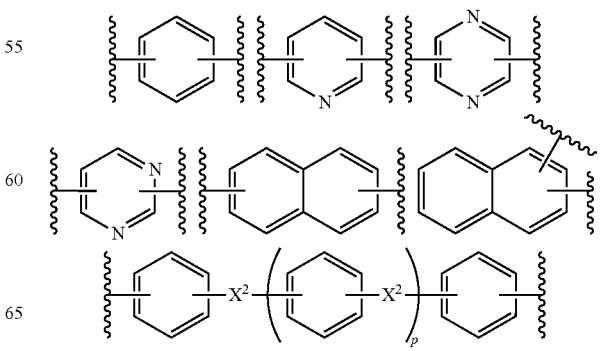

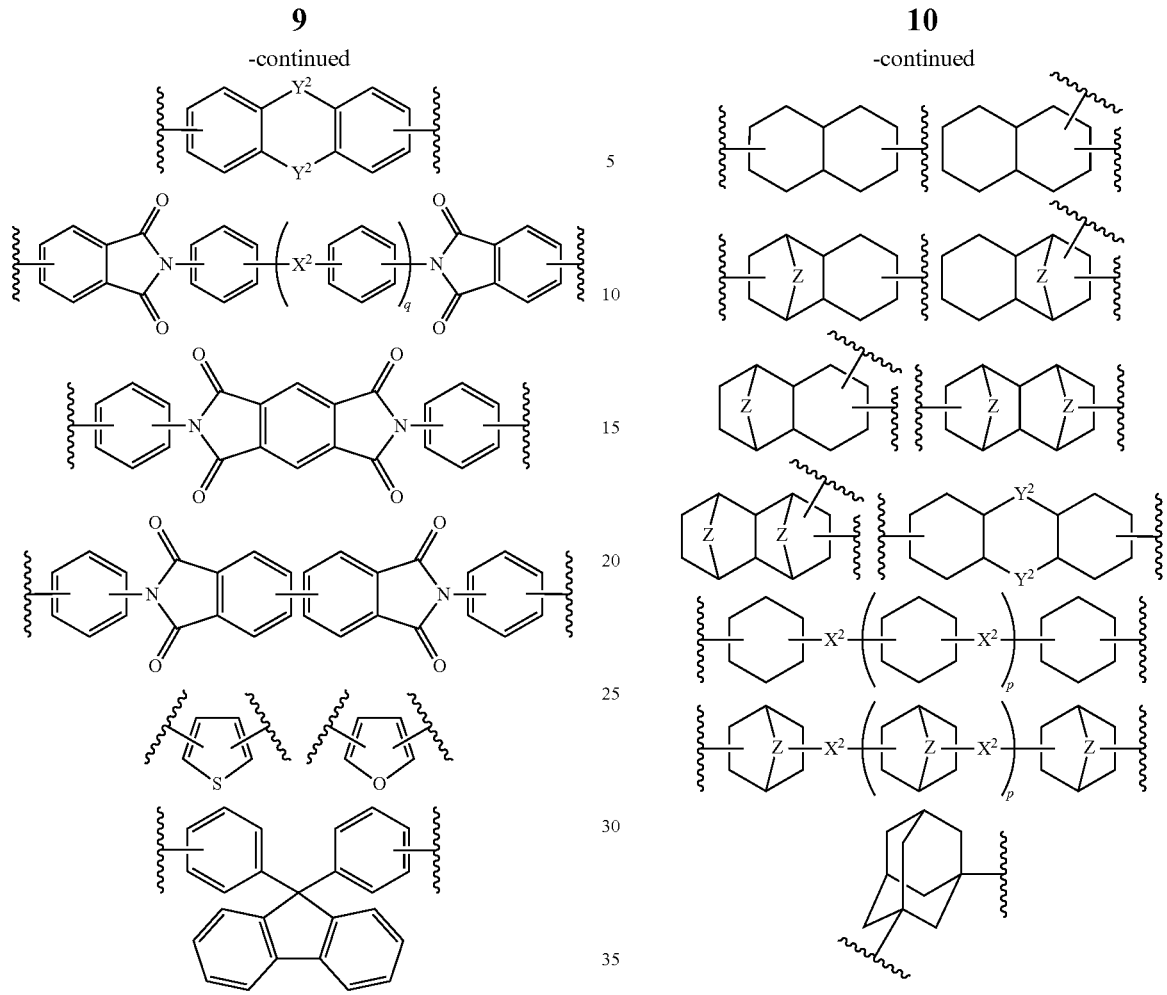

In the foregoing formulae, $X^2$ is one member selected from the group consisting of an alkylene group having 1 to 10 carbon atoms, a fluorinated alkylene group having 1 to 10 carbon atoms, —O—, —S—, —SO—, —SO$_2$—, —CO—, —COO—, —CONH—, and a single bond. In the case where plural $X^2$s are present, each of the plural $X^2$s may be the same as or different from every other $X^2$. Each $Y^2$ may be the same as or different from every other $Y^2$ and is one member selected from the group consisting of —CH$_2$—, —O—, —S—, —SO—, —SO$_2$—, —CO—, and a single bond. Each of p and q is an integer of 0 to 3.

Suitable examples of the alicyclic group or the alicyclic ring-containing group as $R^2$ in the formula (2-1) include the following groups.

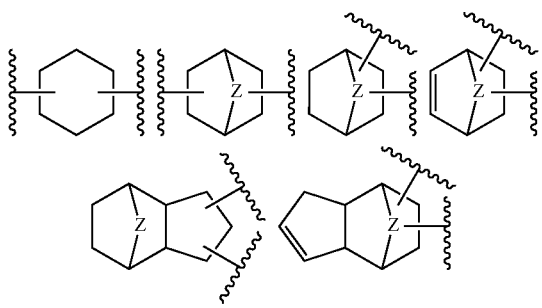

In the foregoing formulae, $X^2$ is one member selected from the group consisting of an alkylene group having 1 to 10 carbon atoms, a fluorinated alkylene group having 1 to 10 carbon atoms, —O—, —S—, —SO—, —SO$_2$—, —CO—, —COO—, —CONH—, and a single bond. In the case where plural $X^2$s are present, each of the plural $X^2$s may be the same as or different from every other $X^2$. Each $Y^2$ may be the same as or different from every other $Y^2$ and is one member selected from the group consisting of —CH$_2$—, —O—, —S—, —SO—, —SO$_2$—, —CO—, and a single bond. Z is one member selected from the group consisting of —CH$_2$—, —CH$_2$CH$_2$—, and —CH=CH—. Each p is an integer of 0 to 3.

The aromatic ring or the alicyclic ring contained in the suitable group as $R^2$ may have one or plural substituents on the ring. As suitable examples of the substituent, a fluorine atom, an alkyl group having 1 to 6 carbon atoms, an alkoxy group having 1 to 6 carbon atoms, a fluorinated alkyl group having 1 to 6 carbon atoms, and a fluorinated alkoxy group having 1 to 6 carbon atoms are preferred. In the case where the substituent is a fluorinated alkyl group or a fluorinated alkoxy group, it is preferably a perfluoroalkyl group or a perfluoroalkoxy group.

In the case where the dialdehyde compound represented by the formula (2-1) is an aromatic dialdehyde, suitable examples thereof include benzenedialdehydes, pyridinedialdehydes, pyrazinedialdehydes, pyrimidinedialdehydes, naphthalenedialdehydes, biphenyldialdehydes, diphenyletherdialdehydes, diphenylsulfonedialdehydes, diphenylsulfidedialdehydes, bis(formylphenoxy)benzenes, [1,4-phenylenebis(1-methylethylidene)]bisbenzaldehydes, 2,2-bis[4-(formylphenoxy)phenyl]propanes, bis[4-(formylphenoxy)phenyl]sulfides, bis[4-(formylphenoxy)phenyl]sulfones, and fluorene-containing dialdehydes.

Specific examples of the benzenedialdehydes include phthalaldehyde, isophthalaldehyde, terephthalaldehyde, 3-fluorophthalaldehyde, 4-fluorophthalaldehyde, 2-fluoroisophthalaldehyde, 4-fluoroisophthalaldehyde, 5-fluoroisophthalaldehyde, 2-fluoroterephthalaldehyde, 3-trifluoromethylphthalaldehyde, 4-trifluoromethylphthalaldehyde, 2-trifluoromethylisophthalaldehyde, 4-trifluoromethylisophthalaldehyde, 5-trifluoromethylisophthalaldehyde, 2-trifluoromethylterephthalaldehyde, 3,4,5,6-tetrafluorophthalaldehyde, 2,4,5,6-tetrafluoroisophthalaldehyde, and 2,3,5,6-tetrafluoroterephthalaldehyde.

Specific examples of the pyridinedialdehydes include pyridine-2,3-dialdehyde, pyridine-3,4-dialdehyde, and pyridine-3,5-dialdehyde.

Specific examples of the pyrazinedialdehydes include pyrazine-2,3-dialdehyde, pyrazine-2,5-dialdehyde, and pyrazine-2,6-dialdehyde.

Specific examples of the pyrimidinedialdehydes include pyrimidine-2,4-dialdehyde, pyrimidine-4,5-dialdehyde, and pyrimidine-4,6-dialdehyde.

Specific examples of the naphthalenedialdehydes include naphthalene-1,5-dialdehyde, naphthalene-1,6-dialdehyde, naphthalene-2,6-dialdehyde, naphthalene-3,7-dialdehyde, 2,3,4,6,7,8-hexafluoronaphthalene-1,5-dialdehyde, 2,3,4,5,6,8-hexafluoronaphthalene-1,6-dialdehyde, 1,3,4,5,7,8-hexafluoronaphthalene-2,6-dialdehyde, 1-trifluoromethylnaphthalne-2,6-dialdehyde, 1,5-bis(trifluoromethyl)naphthalene-2,6-dialdehyde, 1-trifluoromethylnaphthalene-3,7-dialdehyde, 1,5-bis(trifluoromethyl)naphthalene-3,7-dialdehyde, 1-trifluoromethyl-2,4,5,6,8-pentafluoronaphthalene-3,7-dialdehyde, 1-bis(trifluoromethyl)methoxy-2,4,5,6,8-pentafluoronaphthalene-3,7-dialdehyde, 1,5-bis(trifluoromethyl)-2,4,6,8-tetrafluoronaphthalene-3,7-dialdehyde, and 1,5-bis[bis(trifluoromethyl)methoxy]-2,4,6,8-tetrafluoronaphthalene-3,7-dialdehyde.

Specific examples of the biphenyldialdehydes include biphenyl-2,2'-dialdehyde, biphenyl-2,4'-dialdehyde, biphenyl-3,3'-dialdehyde, biphenyl-4,4'-dialdehyde, 6,6'-difluorobiphenyl-3,4'-dialdehyde, 6,6'-difluorobiphenyl-2,4'-dialdehyde, 6,6'-difluorobiphenyl-3,3'-dialdehyde, 6,6'-difluorobiphenyl-4,4'-dialdehyde, 6,6'-ditrifluoromethylbiphenyl-2,2'-dialdehyde, 6,6'-ditrifluoromethylbiphenyl-2,4'-dialdehyde, 6,6'-ditrifluoromethylbiphenyl-3,3'-dialdehyde, 6,6'-ditrifluoromethylbiphenyl-3,4'-dialdehyde, and 6,6'-ditrifluoromethylbiphenyl-4,4'-dialdehyde.

Specific examples of the diphenyletherdialdehydes include diphenylether-2,4'-dialdehyde, diphenylether-3,3'-dialdehyde, diphenylether-3,4'-dialdehyde, and diphenylether-4,4'-dialdehyde.

Specific examples of the diphenylsulfonedialdehydes include diphenylsulfone-3,3'-dialdehyde, diphenylsulfone-3,4'-dialdehyde, and diphenylsulfone-4,4'-dialdehyde.

Specific examples of the diphenylsulfidedialdehydes include diphenylsulfide-3,3'-dialdehyde, diphenylsulfide-3,4'-dialdehyde, and diphenylsulfide-4,4'-dialdehyde.

Specific examples of the diphenylketonedialdehydes include diphenylketone-3,3'-dialdehyde, diphenylketone-3,4'-dialdehyde, and diphenylketone-4,4'-dialdehyde.

Specific examples of the bis(formylphenoxy)benzenes include benzene-1,3-bis(3-formylphenoxy)benzene, 1,4-bis(3-formylphenoxy)benzene, and 1,4-bis(4-formylphenoxy)benzene.

Specific examples of the [1,4-phenylenebis(1-methylethylidene)]bisbenzaldehydes include 3,3'-[1,4-phenylenebis(1-methylethylidene)]bisbenzaldehyde, 3,4'-[1,4-phenylenebis(1-methylethylidene)]bisbenzaldehyde, and 4,4'-[1,4-phenylenebis(1-methylethylidene)]bisbenzaldehyde.

Specific examples of the 2,2-bis[4-(formylphenoxy)phenyl]propanes include 2,2-bis[4-(2-formylphenoxyl)phenyl]propane, 2,2-bis[4-(3-formylphenoxyl)phenyl]propane, 2,2-bis[4-(4-formylphenoxyl)phenyl]propane, 2,2-bis[4-(3-formylphenoxyl)phenyl]hexafluoropropane, and 2,2-bis[4-(4-formylphenoxyl)phenyl]hexafluoropropane.

Specific examples of the bis[4-(formylphenoxy)phenyl]sulfides include bis[4-(3-formylphenoxyl)phenyl]sulfide and bis[4-(4-formylphenoxyl)phenyl]sulfide.

Specific examples of the bis[4-(formylphenoxy)phenyl]sulfones include bis[4-(3-formylphenoxyl)phenyl]sulfone and bis[4-(4-formylphenoxyl)phenyl]sulfone.

Specific examples of the fluorene-containing dialdehydes include fluorene-2,6-dialdehyde, fluoroene-2,7-dialdehyde, dibenzofuran-3,7-dialdehyde, 9,9-bis(4-formylphenyl)fluorene, 9,9-bis(3-formylphenyl)fluorene, and 9-(3-formylphenyl)-9-(4'-formylphenyl) fluorene.

In addition, diphenylalkanedialdehydes or diphenylfluoroalkane dialdehydes represented by the following formulae can also be suitably used as the aromatic dialdehyde compound.

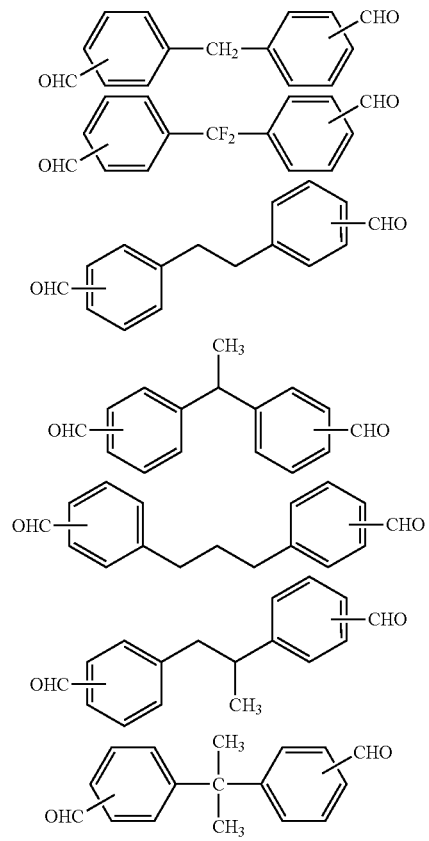

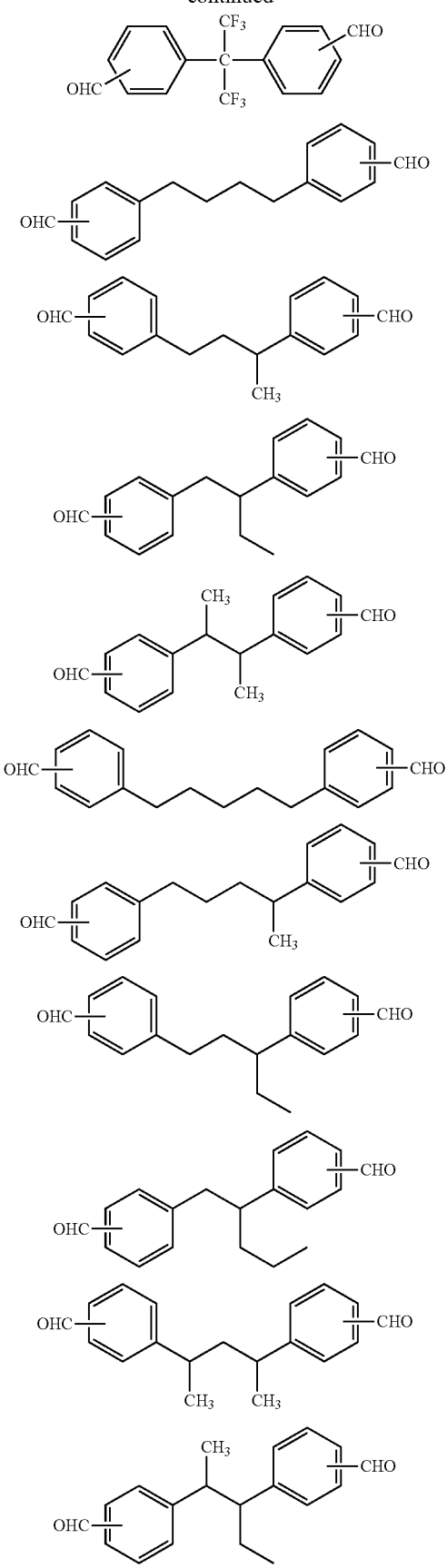
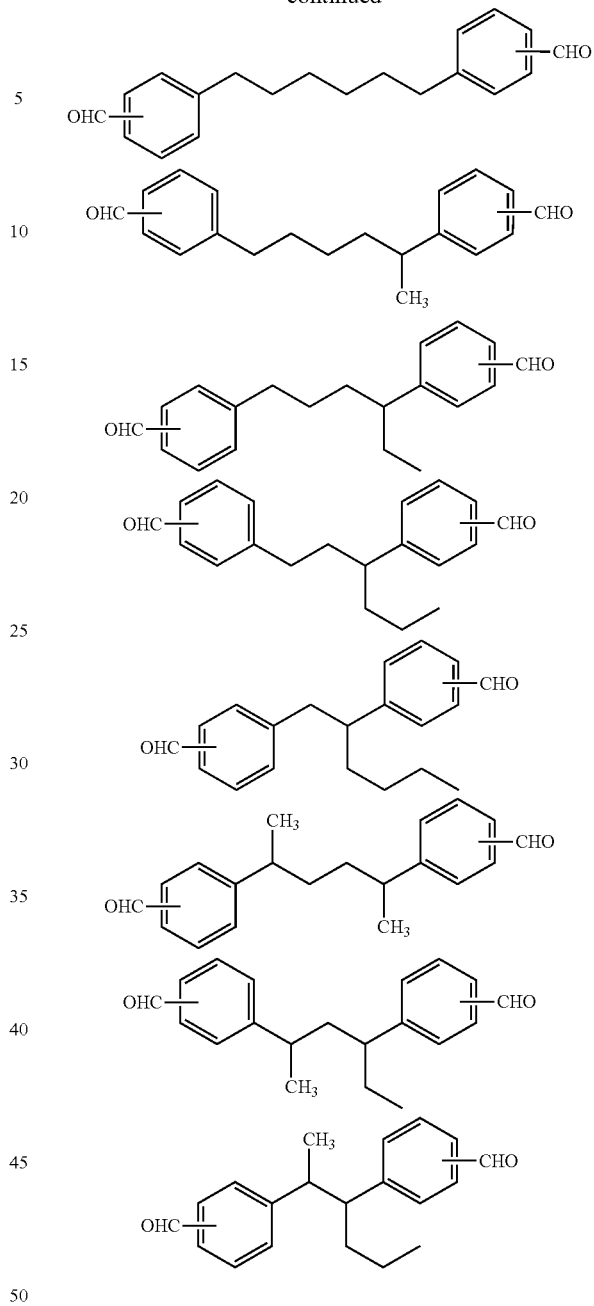
Furthermore, imide bond-containing compounds represented by the following formulae can also be suitably used as the aromatic dialdehyde compound.
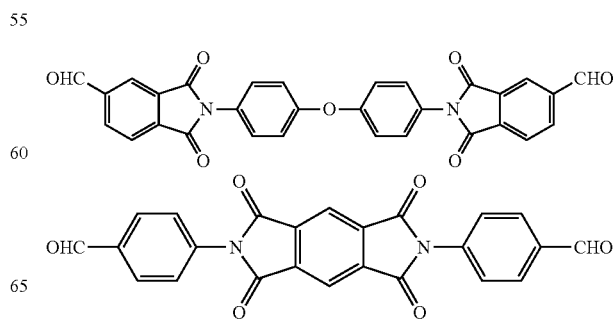

-continued

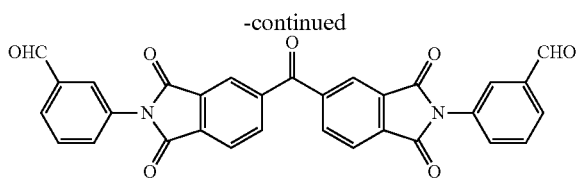

In the case where the dicarbonyl compound represented by the formula (2-1) is an alicyclic group-containing alicyclic dialdehyde, suitable examples thereof include cyclohexane-1,4-dialdehyde, cyclohexane-1,3-dialdehyde, bicyclo[2.2.1]heptane-2,5-dialdehyde, bicyclo[2.2.2]octane-2,5-dialdehyde, bicyclo[2.2.2]oct-7-ene-2,5-dialdehyde, bicyclo[2.2.1]heptane-2,3-dialdehyde, bicyclo[2.2.1]hept-5-ene-2,3-dialdehyde, tricyclo[5.2.1.0$^{2,6}$]decane-3,4-dialdehyde, tricyclo[5.2.1.0$^{2,6}$]dec-4-ene-8,9-dialdehyde, perhydronaphthalene-2,3-dialdehyde, perhydronaphthalene-1,4-dialdehyde, perhydronaphthalene-1,6-dialdehyde, perhydro-1,4-methanonaphthalene-2,3-dialdehyde, perhydro-1,4-methanonaphthalene-2,7-dialdehyde, perhydro-1,4-methanonaphthalene-7,8-dialdehyde, perhydro-1,4:5,8-dimethanonaphthalene-2,3-dialdehyde, perhydro-1,4:5,8-dimethanonaphthalene-2,7-dialdehyde, perhydro-1,4:5,8:9,10-trimethanoanthracene-2,3-dialdehyde, bicyclohexyl-4,4'-dialdehyde, dicyclohexylether-3,4'-dialdehyde, dicyclohexylmethane-3,3'-dialdehyde, dicyclohexylmethane-3,4'-dialdehyde, dicyclohexylmethane-4,4'-dialdehyde, dicyclohexyldifluoromethane-3,3'-dialdehyde, dicyclohexyldifluoromethane-3,4'-dialdehyde, dicyclohexyldifluoromethane-4,4'-dialdehyde, dicyclohexylsulfone-3,3'-dialdehyde, dicyclohexylsulfone-3,4'-dialdehyde, dicyclohexylsulfone-4,4'-dialdehyde, dicyclohexylsulfide-3,3'-dialdehyde, dicyclohexylsulfide-3,4'-dialdehyde, dicyclohexylsulfide-4,4'-dialdehyde, dicyclohexylketone-3,3'-dialdehyde, dicyclohexylketone-3,4'-dialdehyde, dicyclohexylketone-4,4'-dialdehyde, 2,2-bis(3-formylcyclohexyl)propane, 2,2-bis(4-formylcyclohexyl)propane, 2,2-bis(3-formylcyclohexyl)hexafluoropropane, 2,2-bis(4-formylcyclohexyl)hexafluoropropane, 1,3-bis(3-formylcyclohexyl)benzene, 1,4-bis(3-formylcyclohexyl)benzene, 1,4-bis(4-formylcyclohexyl)benzene, 3,3'-[1,4-cyclohexylenebis(1-methylethylidene)]biscyclohexanecarbaldehyde, 3,4'-[1,4-cyclohexylenebis(1-methylethylidene)]biscyclohexanecarbaldehyde, 4,4'-[1,4-cyclohexylenebis(1-methylethylidene)]biscyclohexanecarbaldehyde, 2,2-bis[4-(3-formylcyclohexyl)cyclohexyl]propane, 2,2-bis[4-(4-formylcyclohexyl)cyclohexyl]propane, 2,2-bis[4-(3-formylcyclohexyl)cyclohexyl]hexafluoropropane, 2,2-bis[4-(4-formylphenoxyl)cyclohexyl]hexafluoropropane, bis[4-(3-formylcyclohexyloxyl)cyclohexyl]sulfide, bis[4-(4-formylcyclohexyloxyl)cyclohexyl]sulfide, bis[4-(3-formylcyclohexyloxyl)cyclohexyl]sulfone, bis[4-(4-formylcyclohexyloxyl)cyclohexyl]sulfone, 2,2'-bicyclo[2.2.1]heptane-5,6'-dialdehyde, 2,2'-bicyclo[2.2.1]heptane-6,6'-dialdehyde, and 1,3-diformyladamantane.

Among the dialdehyde compounds as explained above, isophthalaldehyde is preferred in view of the facts that it is easily synthesized or available, and that a polybenzoxazole resin having excellent heat resistance and mechanical properties is readily obtained.

(Dicarboxylic Acid Dihalide)

The dicarboxylic acid dihalide which is used as the raw material of the polybenzoxazole precursor is a compound represented by the following formula (2-2). The dicarboxylic acid dihalide may be used solely or in combination of two or more kinds thereof.

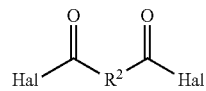

(2-2)

In the formula (2-2), R$^2$ is the same as that in the formula (2); and Hal is a halogen atom.

In the formula (2-2), Hal is preferably chlorine, bromine, or iodine, and more preferably chlorine.

Suitable examples of the compound represented by the formula (2-2) include the compounds described above as suitable examples of the dialdehyde compound, in which, however, the two aldehyde groups thereof are substituted with a halocarbonyl group, and preferably a chlorocarbonyl group.

Among the dicarboxylic acid dihalides as explained above, terephthalic acid dichloride is preferred in view of the facts that it is easily synthesized or available, and that a polybenzoxazole resin having excellent heat resistance and mechanical properties is readily obtained.

Solvent

In the present invention, as the solvent which is used for the preparation of the polybenzoxazole precursor, a solvent containing a compound (A) represented by the following formula (5) is used.

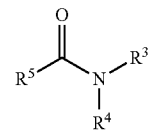

(5)

In the formula (5), each of R$^3$ and R$^4$ is independently an alkyl group having 1 to 3 carbon atoms; and R$^5$ is a group represented by the following formula (5-1) or (5-2):

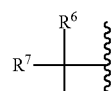

(5-1)

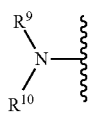

(5-2)

in the formula (5-1), R$^6$ is a hydrogen atom or a hydroxyl group, and each of R$^7$ and R$^8$ is independently an alkyl group having 1 to 3 carbon atoms; and in the formula (5-2), each of R$^9$ and R$^{10}$ is independently a hydrogen atom or an alkyl group having 1 to 3 carbon atoms.

By synthesizing the polybenzoxazole precursor using the solvent containing the compound (A) as described above, even in the case of heat treating the polybenzoxazole precursor at a low temperature, it is possible to produce a polybenzoxazole resin which is excellent in mechanical properties, such as tensile elongation, and in chemical resistance, while suppressing a lowering of transparency to be caused due to coloration of the resin during heating of the polybenzoxazole precursor.

In addition, in the case of heating the polybenzoxazole precursor synthesized using the solvent containing the compound (A) as described above to produce the polybenzoxazole resin, the generation of a defect, such as swelling, crack, and foaming, on the surface of the polybenzoxazole resin can be suppressed. For this reason, in the case of heating a film containing the polybenzoxazole precursor synthesized using the solvent containing the compound (A) as described above to produce a film of the polybenzoxazole resin, a film which is free from a defect, such as crack, blister, and pinhole, and excellent in an external appearance is readily produced.

As for the compound (A) represented by the formula (5), in the case where $R^5$ is the group represented by the formula (5-1), specific examples thereof include N,N,2-trimethylpropionamide, N-ethyl,N,2-dimethylpropionamide, N,N-diethyl-2-methylpropionamide, N,N,2-trimethyl-2-hydroxypropionamide, N-ethyl-N,2-dimethyl-2-hydroxypropionamide, and N,N-diethyl-2-hydroxy-2-methylpropionamide.

As for the compound (A) represented by the formula (5), in the case where $R^5$ is the group represented by the formula (5-2), specific examples thereof include N,N,N',N'-tetramethylurea and N,N,N',N'-tetraethylurea.

Among the examples of the compound (A) as described above, N,N,2-trimethylpropionamide and N,N,N',N'-tetramethylurea are especially preferred. A melting point of N,N,2-trimethylpropionamide is 175° C. at atmospheric pressure, and a melting point of N,N,N',N'-tetramethylurea is 177° C. at atmospheric pressure. Thus, N,N,2-trimethylpropionamide and N,N,N',N'-tetramethylurea have a relatively low melting point among the aromatic diaminediol, the dicarbonyl compound, and the solvent capable of dissolving therein the polybenzoxazole precursor formed. For this reason, if the polybenzoxazole resin is formed by using the polybenzoxazole precursor synthesized using the solvent containing at least one member selected from N,N,2-trimethylpropionamide and N,N,N',N'-tetramethylurea, at heating of the polybenzoxazole precursor, the solvent hardly remains in the polybenzoxazole resin formed, and a lowering of the tensile elongation of the resulting polybenzoxazole resin, or the like is hardly caused.

Furthermore, in view of the fact that N,N,2-trimethylpropionamide and N,N,N',N'-tetramethylurea are not designated as SVHC (Substance of Very High Concern) that is a substance suspected of causing harm in the REACH regulation in EU (European Union), these compounds are also useful from the standpoint that they are a less harm substance.

A content of the compound (A) in the solvent which is used for the preparation of the polybenzoxazole precursor is not particularly limited so long as the object of the present invention is not hindered. Typically, a ratio of the compound (A) relative to the mass of the solvent is preferably 70 mass % or more, more preferably 80 mass % or more, especially preferably 90 mass % or more, and most preferably 100 mass %.

Examples of an organic solvent which can be used together with the compound (A) include nitrogen-containing polar solvents, such as N,N-dimethylformamide, N,N-dimethylacetamide, N-methyl-2-pyrrolidone, hexamethylphosphoramide, and 1,3-dimethyl-2-imidazolidinone; ketones, such as methyl ethyl ketone, methyl isobutyl ketone, cyclohexanone, and isophorone; esters, such as γ-butyrolactone, γ-valerolactone, δ-valerolactone, γ-caprolactone, ε-caprolactone, α-methyl-γ-butyrolactone, ethyl lactate, methyl acetate, ethyl acetate, and n-butyl acetate; cyclic ethers, such as dioxane and tetrahydrofuran; cyclic esters, such as ethylene carbonate and propylene carbonate; aromatic hydrocarbons, such as toluene and xylene; and sulfoxides, such as dimethyl sulfoxide.

Production Method of Polybenzoxazole Precursor

In the present invention, the polybenzoxazole precursor is produced by allowing the aromatic diaminediol and the dicarbonyl compound as described above to react with each other in the solvent containing the compound (A) represented by the foregoing formula (5) according to a well-known method. As representative examples of the production method of the polybenzoxazole precursor, a production method of the case where the dicarbonyl compound is a dialdehyde compound and a production method of the case where the dicarbonyl compound is a dicarboxylic acid halide are hereunder explained.

[Reaction Between Aromatic Diaminediol and Dialdehyde Compound]

The reaction between the aromatic diaminediol and the dialdehyde compound is conducted in the solvent containing the compound (A) represented by the foregoing formula (5). The reaction between the aromatic diaminediol and the dialdehyde compound is a Schiff base-forming reaction and can be conducted according to a well-known method. Although a reaction temperature is not particularly limited, in general, it is preferably 20 to 200° C., more preferably 20 to 160° C., and especially preferably 100 to 160° C.

The reaction between the aromatic diaminediol and the dialdehyde compound may also be conducted by adding an entrainer to the solvent, while undergoing reflux dehydration. The entrainer is not particularly limited, and it is properly selected among organic solvents capable of forming an azeotropic mixture together with water and forming a two-phase system with water at room temperature. Suitable examples of the entrainer include esters, such as isobutyl acetate, allyl acetate, n-propyl propionate, isopropyl propionate, n-butyl propionate, and isobutyl propionate; ethers, such as dichloromethyl ether and ethyl isoamyl ether; ketones, such as ethyl propyl ketone; and aromatic hydrocarbons, such as toluene.

Although a reaction time between the aromatic diaminediol and the dialdehyde compound is not particularly limited, typically, it is preferably about 2 to 72 hours.

In producing the polybenzoxazole precursor, a use amount of the dialdehyde compound is preferably 0.5 to 1.5 moles, and more preferably 0.7 to 1.3 moles per mole of the aromatic diaminediol.

A use amount of the solvent is not particularly limited so long as the reaction between the aromatic diaminediol and the dialdehyde compound is advanced favorably. Typically, the solvent is used in an amount of 1 to 40 times by mass, and preferably 1.5 to 20 times by mass relative to a total sum of the mass of the aromatic diaminediol and the dialdehyde compound.

The reaction between the aromatic diaminediol and the dialdehyde compound is conducted such that a number average molecular weight of the polybenzoxazole precursor formed reaches 1,000 to 20,000, and preferably 1,200 to 5,000.

[Reaction Between Aromatic Diaminediol and Dicarboxylic Acid Dihalide]

The reaction between the aromatic diaminediol and the dicarboxylic acid dihalide is conducted in the solvent containing the compound (A) represented by the foregoing formula (5). Although a reaction temperature is not particularly limited, in general, it is preferably −20 to 150° C., more preferably −10 to 150° C., and especially preferably −5 to 70° C. In the reaction between the aromatic diaminediol and the dicarboxylic acid dihalide, a hydrogen halide is formed as a by-product. In order to neutralize such a hydrogen halide, a small amount of an organic base, such as triethylamine, pyridine, and N,N-dimethyl-4-aminopyridine, or an alkali metal hydroxide, such as sodium hydroxide and potassium hydroxide, may be added in the reaction liquid.

Although a reaction time between the aromatic diaminediol and the dicarboxylic acid dihalide is not particularly limited, typically, it is preferably about 2 to 72 hours.

In producing the polybenzoxazole precursor, a use amount of the dicarboxylic acid dihalide is preferably 0.5 to 1.5 moles, and more preferably 0.7 to 1.3 moles per mole of the aromatic diaminediol.

A use amount of the solvent is not particularly limited so long as the reaction between the aromatic diaminediol and the dicarboxylic acid dihalide is advanced favorably. Typically, the solvent is used in an amount of 1 to 40 times by mass, and preferably 1.5 to 20 times by mass relative to a total sum of the mass of the aromatic diaminediol and the dicarboxylic acid dihalide.

The reaction between the aromatic diaminediol and the dicarboxylic acid dihalide is conducted such that a number average molecular weight of the polybenzoxazole precursor formed reaches 1,000 to 20,000, and preferably 1,200 to 5,000.

A solution of the polybenzoxazole precursor is obtained by each of the methods as described above. In the case of forming the polybenzoxazole resin, the solution of the polybenzoxazole precursor can be used as it is. In addition, a paste or solid of the polybenzoxazole precursor which is obtained by removing at least a part of the solvent from the solution of the polybenzoxazole precursor under reduced pressure at a low temperature to such an extent that conversion of the polybenzoxazole precursor into the polybenzoxazole resin is not caused, can also be used. In addition, a solution of the polybenzoxazole precursor, in which a solid content concentration is adjusted by adding an appropriate amount of the compound (A) represented by the foregoing formula (5), or the like to the solution of the polybenzoxazole precursor obtained by each of the reactions as described above, can also be used for the preparation of the polybenzoxazole resin.

Production Method of Polybenzoxazole Resin

The thus obtained polybenzoxazole precursor is heated to form the polybenzoxazole resin. On that occasion, the polybenzoxazole precursor is heated at 120° C. to 350° C., and preferably at 150° C. to 350° C. By heating the polybenzoxazole precursor at a temperature falling within such a range, the polybenzoxazole resin can be formed while suppressing thermal degradation or thermal decomposition of the polybenzoxazole resin formed.

In addition, in the case of conducting heating of the polybenzoxazole precursor at a high temperature, there is a concern that a lot of energy is consumed, or time degradation of treatment equipment at a high temperature is promoted, and therefore, it is also preferred to conduct heating of the polybenzoxazole precursor at a bit lower temperature. Specifically, an upper limit of the temperature at which the polybenzoxazole precursor is heated is preferably 250° C. or lower, more preferably 220° C. or lower, and especially preferably 200° C. or lower.

At heating of the polybenzoxazole precursor, a form of the polybenzoxazole precursor is not particularly limited.

Examples of the form of the polybenzoxazole precursor include a film, a fiber, a rectangular parallelepiped, a sphere, a hemisphere, and a circular cylinder.

As a representative example of the production method of the polybenzoxazole resin, a production method of a polybenzoxazole resin film is hereunder described.

In producing a polybenzoxazole resin film, it is preferred that a polybenzoxazole precursor film is formed by coating a solution of the polybenzoxazole precursor on a base substance. The quality of material of the base substance is not particularly limited so long as at heating of the polybenzoxazole precursor film, thermal degradation or deformation is not generated. In addition, a shape of the base substance is not particularly limited so long as it is possible to coat the solution of the polybenzoxazole precursor. Examples of the base substance include electronic devices, such as a semiconductor device, and intermediate products, such as multilayer wiring boards, on which an electrode or a wiring to be insulated is formed, and a variety of substrates. In the case where the base substance is a substrate, suitable examples of the material of the substrate include glass; silicon; aluminum (Al); aluminum alloys, such as aluminum-silicon (Al—Si), aluminum-copper (Al—Cu), and aluminum-silicon-copper (Al—Si—Cu); titanium (Ti); titanium alloys, such as titanium-tungsten (Ti—W); titanium nitride (TiN); tantalum (Ta); tantalum nitride (TaN); tungsten (W); tungsten nitride (WN); and copper.

By using, for example, an electronic device, such as a semiconductor device, or a multilayer wiring board as a base substance to form a polybenzoxazole resin film on the base substance, an insulating film made of the polybenzoxazole resin can be formed on the electronic device or the multilayer wiring board. In addition, by forming a polybenzoxazole resin film using a plate-shape substrate as a base substance, the polybenzoxazole resin film can be obtained. The polybenzoxazole resin film formed on the substrate may be used directly on the substrate, or may be used in a state of being stripped off from the substrate.

A method of coating the solution of the polybenzoxazole precursor on the base substance is not particularly limited. Examples of the method of coating the solution of the polybenzoxazole precursor on the base substance include a spin coating method, a spray method, a roller coating method, and an immersion method. Although a film thickness of the coated film of the solution of the polybenzoxazole precursor formed on the base substance is not particularly limited, it is preferably 0.8 to 350 μm, and more preferably 1.3 to 85 μm. When the solution of the polybenzoxazole precursor is coated in such a film thickness, the polybenzoxazole resin film having desired properties is easily obtained by short-time heating.

Although a film thickness of the polybenzoxazole resin film formed is not particularly limited, it is preferably 0.5 to 200 μm, and more preferably 0.8 to 50 μm. The film thickness of the polybenzoxazole resin film can be regulated by the solid content concentration of the solution of the polybenzoxazole precursor, or the film thickness of the coated film made of the solution of the polybenzoxazole precursor.

According to the above-described method, even in the case of heat treating the polybenzoxazole precursor at a low temperature, a polybenzoxazole resin that is excellent in mechanical properties, such as tensile elongation, and in chemical resistance, is suppressed in terms of coloration, and is high in transparency can be produced.

EXAMPLES

The present invention is hereunder described in more detail by reference to Examples, but it should not be construed that the present invention is limited to these Examples.

Examples 1 to 14 and Comparative Examples 1 to 3

In the Examples and Comparative Examples, the following DA1 and DA2 were used as the aromatic diaminediol, and the following DC1 and DC2 were used as the dicarbonyl compound.
DA1: 2,2'-Bis(3-amino-4-hydroxyphenyl)hexafluoropropane
DA2: 4,4'-Diamino-3,3'-dihydroxybiphenyl
DC1: Isophthalaldehyde
DC2: Terephthalic acid dichloride
In each of the Examples and Comparative Examples, in synthesizing a polybenzoxazole precursor, the following solvents S1 to S6 were used.
S1: N,N,N',N'-Tetramethylurea (TMU)
S2: N,N,2-Trimethylpropionamide (DMIB)
S3: Equimolar mixture of N,N,N',N'-tetramethylurea (TMU) and N-methyl-2-pyrrolidone (NMP) (mass ratio: TMU/NMP=54.0/46.0)
S4: Equimolar mixture of N,N,2-trimethylpropionamide (DMIB) and N-methyl-2-pyrrolidone (NMP) (mass ratio: DMIB/NMP=53.9/46.1)
S5: N-Methyl-2-pyrrolidone (NMP)
S6: N,N-Dimethylacetamide (DMAc)

The polybenzoxazole precursors were prepared according to the following methods. As for the preparation method of the polybenzoxazole precursor, a reaction between the aromatic diaminediol and the dialdehyde compound (DC1) and a reaction between the aromatic diaminediol and the dicarboxylic acid dihalide (DC2) are described below.

(Reaction Between Aromatic Diaminediol and Dialdehyde Compound)

In an Erlenmeyer flask having a rotor put therein, 2 mmoles of an aromatic diaminediol of the kind shown in Table 1 and 1 mL of a solvent of the kind shown in Table 1 were added, and the contents of the flask were then stirred using a magnetic stirrer for 5 minutes. Thereafter, 2 mmoles of DC1 (isophthalaldehyde) was charged in the flask, and the contents of the flask were allowed to react with each other in a nitrogen atmosphere while refluxing for 3 hours. Subsequently, the reaction solution was dehydrated by means of vacuum distillation, thereby obtaining a solution of a polybenzoxazole precursor. As an example, a number average molecular weight of the polybenzoxazole precursor in Example 1 was about 1,500.

(Reaction Between Aromatic Diaminediol and Dicarboxylic Acid Dihalide)

In an Erlenmeyer flask having a rotor put therein, 4 mmoles of an aromatic diaminediol of the kind shown in Table 1, 8 mmoles of triethylamine, and 1 mL of a solvent of the kind shown in Table 1 were added. Subsequently, a solution of 4 mmoles of DC2 (terephthalic acid dichloride) dissolved in 1 mL of a solvent of the kind shown in Table 1 was added dropwise in the Erlenmeyer flask in a nitrogen atmosphere at 0° C. over 30 minutes. After completion of the dropwise addition, the reaction solution within the Erlenmeyer flask was further stirred at room temperature for 5 hours, thereby obtaining a solution of a polybenzoxazole precursor.

A polybenzoxazole resin film was formed using the solution of the polybenzoxazole precursor obtained in each of the Examples and Comparative Examples according to the following method. The polybenzoxazole resin film formed was evaluated with respect to tensile elongation, film forming properties, chemical resistance (to NMP), and coloration. These evaluation results are shown in Table 1.

(Evaluation of Tensile Elongation)

The obtained solution of the polybenzoxazole precursor was coated on a wafer substrate with an applicator (Model TBA-7, manufactured by Yoshimitsu Seiki Co., Ltd.). The coated film on the wafer substrate was heated at a temperature shown in Table 1 for 20 minutes, thereby forming a polybenzoxazole resin film having a film thickness of about 10 μm. A dumbbell-type test piece having a shape in conformity with the IEC450 standard was punched out from the obtained polybenzoxazole resin film, thereby obtaining a test piece for tensile elongation measurement. A fracture elongation of the polybenzoxazole resin film was measured using the resulting test piece under a condition at a chuck-to-chuck distance of 20 mm and a tension rate of 2 mm/min by a universal testing machine (TENSILON, manufactured by Orientec Co., Ltd.). The case where the fracture elongation is 25% or more was determined to be "good", and the case where it is less than 25% was determined to be "bad". The evaluation results of the tensile elongation are shown in Table 1.

(Evaluation of Film Forming Properties)

A polybenzoxazole resin film having a film thickness of about 10 μm was formed in the same manner as that in the evaluation of tensile elongation. The resulting polybenzoxazole resin film was observed through visual inspection and confirmed with respect to a fault, such as swelling, crack, and foaming. The case where such a fault was observed in a range of about 10 to 30% of the entire area of the polybenzoxazole resin film was determined to be "good", and the case where such a fault was observed in a range of exceeding about 30% of the entire area of the polybenzoxazole resin film was determined to be "bad".

(Evaluation of Chemical Resistance)

A polybenzoxazole resin film having a film thickness of about 10 μm was formed in the same manner as that in the evaluation of tensile elongation. 1 cc of NMP was added dropwise on the formed film, and after allowing it to stand for one minute, NMP was removed. A surface state of the film after removing NMP was observed through visual inspection. The case where a change was not observed on the film surface was determined to be "good", and the case where a scar, such as a depression, remained was determined to be "bad".

(Evaluation of Coloration)

A polybenzoxazole resin film having a film thickness of about 10 μm was formed in the same manner as that in the evaluation of tensile elongation. The resulting polybenzoxazole resin film was observed through visual inspection. The case where the polybenzoxazole resin film was free from coloration and transparent was determined to be "good", and the case where the polybenzoxazole resin film was colored was determined to be "bad".

TABLE 1

|  | Aromatic diamine-diol | Dicarbonyl compound | Solvent | Baking temp. (° C.) | Tensile elongation | Film forming properties | Chemical resistance | Coloration |
|---|---|---|---|---|---|---|---|---|
| Ex. 1 | DA1 | DC1 | S1 | 350 | Good | Good | Good | Good |
| Ex. 2 | DA1 | DC1 | S2 | 350 | Good | Good | Good | Good |
| Ex. 3 | DA2 | DC1 | S1 | 350 | Good | Good | Good | Good |
| Ex. 4 | DA2 | DC1 | S2 | 350 | Good | Good | Good | Good |
| Ex. 5 | DA2 | DC2 | S1 | 350 | Good | Good | Good | Good |
| Ex. 6 | DA2 | DC2 | S2 | 350 | Good | Good | Good | Good |
| Ex. 7 | DA1 | DC1 | S1 | 180 | Good | Good | Good | Good |
| Ex. 8 | DA1 | DC1 | S2 | 180 | Good | Good | Good | Good |
| Ex. 9 | DA2 | DC1 | S1 | 180 | Good | Good | Good | Good |
| Ex. 10 | DA2 | DC1 | S2 | 180 | Good | Good | Good | Good |
| Ex. 11 | DA2 | DC2 | S1 | 180 | Good | Good | Good | Good |
| Ex. 12 | DA2 | DC2 | S2 | 180 | Good | Good | Good | Good |
| Ex. 13 | DA1 | DC1 | S3 | 180 | Good | Good | Good | Good |
| Ex. 14 | DA1 | DC1 | S4 | 180 | Good | Good | Good | Good |
| Comp. Ex. 1 | DA1 | DC1 | S5 | 180 | Bad | Good | Bad | Bad |
| Comp. Ex. 2 | DA1 | DC1 | S5 | 350 | Good | Good | Good | Bad |
| Comp. Ex. 3 | DA1 | DC1 | S6 | 350 | Good | Bad | Good | Bad |

According to Examples 1 to 14, it is noted that by heating the solution of the polybenzoxazole precursor synthesized using the solvent containing the compound (A) having the structure of the foregoing formula (5) at a prescribed temperature, the polybenzoxazole resin which is excellent in tensile elongation and chemical resistance is obtained while suppressing a lowering of transparency to be caused due to coloration of the resin even in the case of baking at a lower temperature of lower than 200° C., and of baking at a high temperature of higher than 300° C. In addition, according to the results of the test of film forming properties regarding Examples 1 to 14, it is noted that by heat treating the thin film made of the solution of the polybenzoxazole precursor synthesized using the solvent containing the compound (A) having the structure of the foregoing formula (5), the polybenzoxazole resin film which is free from a defect, such as blister, crack, and pinhole, is obtained.

According to Comparative Examples 1 to 3, it is noted that in the case of not using the solvent containing the compound (A) having the structure of the foregoing formula (5), in producing the polybenzoxazole resin by heating the solution of the polybenzoxazole precursor, the polybenzoxazole resin is apt to be colored. In addition, according to Comparative Examples 1 to 3, it is noted that in the case of not using the solvent containing the compound (A) having the structure of the foregoing formula (5), the polybenzoxazole resin which is excellent in tensile elongation and chemical resistance was not obtained, or the polybenzoxazole resin film which is free from a defect, such as blister, crack, and pinhole, was not obtained, depending upon the kind of the solvent or the baking temperature.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method for producing a polybenzoxazole resin film, comprising coating a solution of a polybenzoxazole precursor on a base substance to thereby obtain a laminate comprising the base substance and a polybenzoxazole precursor film formed thereon, and heating the laminate at 120° C. or higher, and lower than 250° C., wherein a film thickness of a coated film of the solution of the polybenzoxazole precursor is 0.8 to 350 μm, and wherein the polybenzoxazole precursor is obtained by allowing an aromatic diaminediol represented by the following formula (1) and a dicarbonyl compound represented by the following formula (2) to react with each other in a solvent containing at least a compound (A) represented by the following formula (5):

(1)

wherein $R^1$ is a tetravalent organic group containing at least one aromatic ring; and with respect to two pairs of combinations of an amino group and a hydroxyl group contained in the aromatic diaminediol represented by the formula (1), in each of the combinations, the amino group and the hydroxyl group are bonded to two carbon atoms adjacent to each other on the aromatic ring contained in $R^1$,

(2)

wherein $R^2$ represents a divalent organic group; and A represents a hydrogen atom or a halogen atom, and

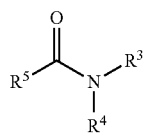
(5)

wherein each of $R^3$ and $R^4$ is independently an alkyl group having 1 to 3 carbon atoms; and $R^5$ is a group represented by the following formula (5-1) or (5-2):

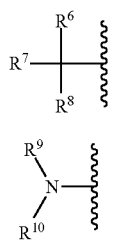
(5-1)
(5-2)

wherein $R^6$ is a hydrogen atom or a hydroxyl group; each of $R^7$ and $R^8$ is independently an alkyl group having 1 to 3 carbon atoms; and each of $R^9$ and $R^{10}$ is independently a hydrogen atom or an alkyl group having 1 to 3 carbon atoms.

2. The method for producing a polybenzoxazole resin film according to claim 1, wherein the compound (A) is N,N,2-trimethylpropionamide or N,N,N',N'-tetramethylurea.

3. The method for producing a polybenzoxazole resin film according to claim 1, wherein a ratio of the compound (A) relative to the mass of the solvent is 70 mass % or more.

4. The method for producing a polybenzoxazole resin film according to claim 1, wherein a ratio of the compound (A) relative to the mass of the solvent is 80 mass % or more.

5. The method for producing a polybenzoxazole resin film according to claim 1, wherein a ratio of the compound (A) relative to the mass of the solvent is 90 mass % or more.

6. The method for producing a polybenzoxazole resin film according to claim 1, wherein a ratio of the compound (A) relative to the mass of the solvent is 100 mass %.

7. The method for producing a polybenzoxazole resin film according to claim 1, wherein the polybenzoxazole precursor is heated at 150° C. or higher.

8. The method for producing a polybenzoxazole resin film according to claim 1, wherein the polybenzoxazole precursor is heated at 220° C. or lower.

9. The method for producing a polybenzoxazole resin film according to claim 1, wherein the polybenzoxazole precursor is heated at 200° C. or lower.

10. The method for producing a polybenzoxazole resin film according to claim 1, wherein the polybenzoxazole precursor is heated at lower than 200° C.

11. The method for producing a polybenzoxazole resin film according to claim 1, wherein $R^1$ is a group represented by any one of the following formulae (1-1) to (1-5):

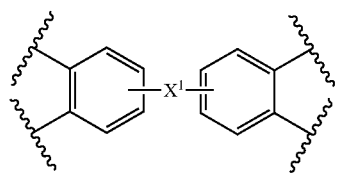
(1-1)

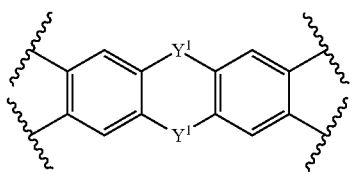
(1-2)

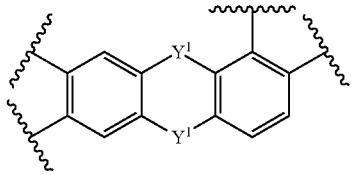
(1-3)

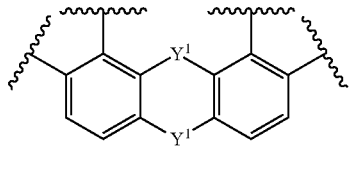
(1-4)

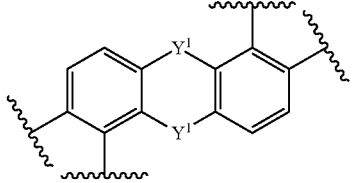
(1-5)

wherein $X^1$ is a member selected from the group consisting of an alkylene group having 1 to 10 carbon atoms, a fluorinated alkylene group having 1 to 10 carbon atoms, —O—, —S—, —SO—, —SO$_2$—, —CO—, —COO—, —CONH—, and a single bond, each $Y^1$ may be the same as or different from every other $Y^1$ and is a member selected from the group consisting of —CH$_2$—, —O—, —S—, —SO—, —SO$_2$—, —CO—, and a single bond.

12. The method for producing a polybenzoxazole resin film according to claim 1, wherein the polybenzoxazole resin film is an insulating material or a protective material in electric or electronic parts.

13. The method for producing a polybenzoxazole resin film according to claim 1, wherein the method further comprises stripping off the polybenzoxazole resin film from the base substance.

14. The method for producing a polybenzoxazole resin film according to claim 1, wherein the base substance is an electronic substrate.

15. A method for producing an electric or electronic part comprising a polybenzoxazole resin film, the method comprising forming the polybenzoxazole resin film using the method according to claim 1.

16. A method for producing a polybenzoxazole resin, comprising: coating a solution of a polybenzoxazole precursor on a base substance to thereby obtain a laminate comprising the base substance and a polybenzoxazole precursor film formed thereon, and heating the laminate at 120° C. or higher and lower than 250° C., wherein a film thickness of a coated film of the solution of the polybenzoxazole precursor is 0.8 to 350 μm, and wherein $R^1$ is a group represented by any one of the following formulae (1-1) to (1-5):

(1-1) 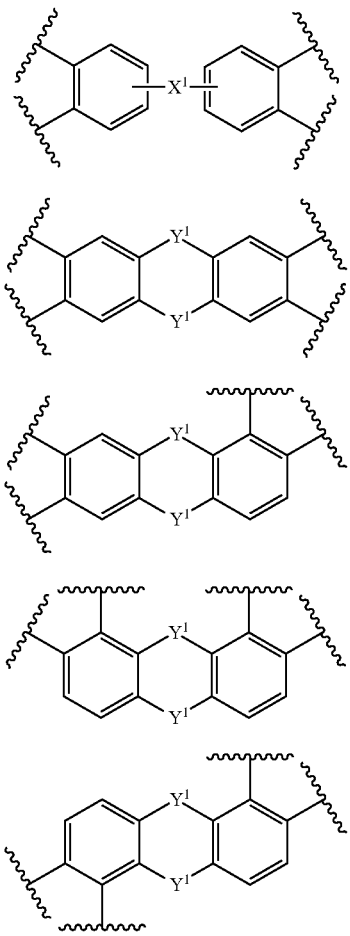

(1-2)

(1-3)

(1-4)

(1-5)

wherein $X^1$ is a member selected from the group consisting of an alkylene group having 1 to 10 carbon atoms, a fluorinated alkylene group having 1 to 10 carbon atoms, —O—, —S—, —SO—, —SO$_2$—, —CO—, —COO—, —CONH—, and a single bond, each $Y^1$ may be the same as or different from every other $Y^1$ and is a member selected from the group consisting of —CH$_2$—, —O—, —S—, —SO—, —SO$_2$—, —CO—, and a single bond, wherein the polybenzoxazole precursor is obtained by allowing an aromatic diaminediol represented by the following formula (1) and a dicarbonyl compound represented by the following formula (2) to react with each other in a solvent containing at least a compound (A) represented by the following formula (5):

(1) 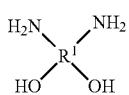

wherein $R^1$ is a tetravalent organic group containing at least one aromatic ring; and with respect to two pairs of combinations of an amino group and a hydroxyl group contained in the aromatic diaminediol represented by the formula (1), in each of the combinations, the amino group and the hydroxyl group are bonded to two carbon atoms adjacent to each other on the aromatic ring contained in $R^1$, (2) 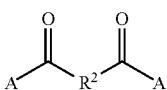

wherein $R^2$ represents a divalent organic group; and A represents a hydrogen atom or a halogen atom, and (5) 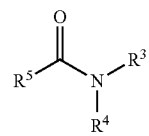

wherein each of $R^3$ and $R^4$ is independently an alkyl group having 1 to 3 carbon atoms; and $R^5$ is a group represented by the following formula (5-1) or (5-2):

(5-1) 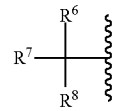

(5-2) 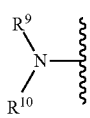

wherein $R^6$ is a hydrogen atom or a hydroxyl group; each of $R^7$ and $R^8$ is independently an alkyl group having 1 to 3 carbon atoms; and each of $R^9$ and $R^{10}$ is independently a hydrogen atom or an alkyl group having 1 to 3 carbon atoms.

17. The method for producing a polybenzoxazole resin film according to claim 1, wherein a film thickness of the polybenzoxazole resin film is 0.5 to 200 μm.

18. The method for producing a polybenzoxazole resin film according to claim 10, wherein a film thickness of the polybenzoxazole resin film is 0.5 to 200 μm.

* * * * *